United States Patent
Huo et al.

(10) Patent No.: US 10,951,825 B2
(45) Date of Patent: Mar. 16, 2021

(54) IMAGE PHOTOGRAPHING METHOD APPLIED TO TERMINAL, AND TERMINAL DEVICE

(71) Applicant: HUAWEI TECHNOLOGIES CO., LTD., Shenzhen (CN)

(72) Inventors: Jieguang Huo, Shanghai (CN); Jun Wu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/613,027

(22) PCT Filed: Aug. 2, 2017

(86) PCT No.: PCT/CN2017/095677
§ 371 (c)(1),
(2) Date: Nov. 12, 2019

(87) PCT Pub. No.: WO2018/214284
PCT Pub. Date: Nov. 29, 2018

(65) Prior Publication Data
US 2020/0169664 A1    May 28, 2020

(30) Foreign Application Priority Data
May 23, 2017    (CN) .......................... 201710369480.2

(51) Int. Cl.
*H04N 5/232* (2006.01)
*G06T 3/40* (2006.01)
(Continued)

(52) U.S. Cl.
CPC ....... *H04N 5/23287* (2013.01); *G06T 3/4007* (2013.01); *G06T 5/001* (2013.01);
(Continued)

(58) Field of Classification Search
CPC .......... H04N 5/23287; H04N 5/23296; H04N 5/232; G06T 3/4007; G06T 5/001; G06T 5/50; G06T 7/0002; G06T 2207/20221
See application file for complete search history.

(56) References Cited

U.S. PATENT DOCUMENTS

| | | | | |
|---|---|---|---|---|
| 5,969,757 A | * | 10/1999 | Okada ................... | H04N 5/217 348/219.1 |
| 2008/0239136 A1 | * | 10/2008 | Kanai .................... | H04N 5/217 348/340 |

(Continued)

FOREIGN PATENT DOCUMENTS

| | | |
|---|---|---|
| CN | 104486534 A | 4/2015 |
| CN | 106657747 A | 5/2017 |

(Continued)

OTHER PUBLICATIONS

Office Action dated Sep. 27, 2019 from corresponding application No. CN 201780018138.6.

(Continued)

*Primary Examiner* — Jason A Flohre
(74) *Attorney, Agent, or Firm* — Hauptman Ham, LLP

(57) ABSTRACT

A method includes obtaining a first image of a to-be-photographed object based on an input received by way of a user interface, the first image being obtained using a terminal having a lens in a first position. The method also includes detecting a moiré pattern on the first image. The method further includes automatically moving the lens from the first position to a second position on a plane perpendicular to an optical axis of the lens. The method additionally includes obtaining at least one second image of the to-be-photographed object one or more of with the lens in the second position or between the first position and the second position. The method also includes restoring a detected moiré pattern region of the first image based on the (Continued)

at least one second image to generate a restored image. The method further includes outputting the restored image to a display.

17 Claims, 6 Drawing Sheets

(51) Int. Cl.
    *G06T 5/00*     (2006.01)
    *G06T 5/50*     (2006.01)
    *G06T 7/00*     (2017.01)
    *H04N 5/21*     (2006.01)
    *H04N 9/04*     (2006.01)

(52) U.S. Cl.
    CPC .............. *G06T 5/50* (2013.01); *G06T 7/0002* (2013.01); *H04N 5/21* (2013.01); *H04N 5/23296* (2013.01); *H04N 9/0451* (2018.08); *G06T 2207/20221* (2013.01)

(56) References Cited

U.S. PATENT DOCUMENTS

| | | | | |
|---|---|---|---|---|
| 2011/0254985 | A1* | 10/2011 | Hiramoto | H04N 5/2254 |
| | | | | 348/294 |
| 2016/0366340 | A1* | 12/2016 | Okamoto | H04N 5/23293 |
| 2016/0381336 | A1* | 12/2016 | Akahane | H04N 5/265 |
| | | | | 348/239 |
| 2017/0019599 | A1* | 1/2017 | Muramatsu | H04N 5/23258 |
| 2018/0027149 | A1 | 1/2018 | Murase | |

FOREIGN PATENT DOCUMENTS

| | | |
|---|---|---|
| CN | 106664359 A | 5/2017 |
| JP | 2000338000 A | 12/2000 |
| JP | 2008011334 A | 1/2008 |

OTHER PUBLICATIONS

International search report dated Feb. 22, 2018 from corresponding application No. PCT/CN2017/095677.

* cited by examiner

IMAGE PHOTOGRAPHING METHOD APPLIED TO TERMINAL, AND TERMINAL DEVICE

This application is a national stage of International Application No. PCT/CN2017/095677, filed on Aug. 2, 2017, which claims priority to Chinese Patent Application No. 201710369480.2, filed on May 23, 2017.

TECHNICAL FIELD

This application relates to the field of image processing technologies, and in particular, to an image photographing method applied to a terminal, and a terminal device.

BACKGROUND

In an image photographing process, if a spatial frequency of a pixel of a photosensitive element such as a charge coupled device (charge coupled device, CCD) or a complementary metal oxide semiconductor (complementary metal oxide semiconductor, CMOS) is close to a spatial frequency of a periodic pattern (for example, a grid or a stripe) on a photographed object, a moiré pattern is generated. Consequently, a color high frequency stripe appears on a photographed image, and quality of the image is affected, as shown in FIG. 1.

Currently, a moiré effect of a photographed image is alleviated mainly by using the following two methods:

In a first method, a high spatial frequency part of an image is filtered out by using a low-pass filter, to eliminate a moiré pattern that may be generated in an image photographing process. The method includes two manners: hardware filtering and software filtering.

The hardware filtering means that a low-pass filter is installed on a terminal device to filter out a high spatial frequency part of an image. However, relatively high costs are required for installing the low-pass filter, an application scenario cannot be flexibly selected, and imaging acutance of the terminal device is reduced. Therefore, quality of a photographed image is affected.

The software filtering means that a high spatial frequency part of an image is filtered out by using a dedicated image modifier. However, details of a photographed image cannot be restored through the software filtering.

In a second method, a new type of image sensor is used, so that a moiré pattern is avoided by increasing randomness of a photosensitive unit array in the image sensor. For example, a sensor with a 6×6 photosensitive unit array shown in FIG. 2a increases randomness of a photosensitive unit array in comparison with a sensor with a 2×2 photosensitive unit array shown in FIG. 2b, where R represents red (red), G represents green (green), and B represents blue (blue).

Because the new type of image sensor has a relatively complex photosensitive unit array, an image generation algorithm is complex.

SUMMARY

Embodiments of this application provide an image photographing method applied to a terminal, and a terminal device, to alleviate impact of a moiré pattern on quality of a photographed image.

An aspect of this application provides an image photographing method applied to a terminal. The method includes: obtaining, by a terminal device, a first image of a to-be-photographed object; moving a lens of the terminal device when it is determined that there is a moiré pattern on the first image, and obtaining at least one second image of the to-be-photographed object in a process of moving the lens; and restoring a moiré pattern region of the first image based on the at least one obtained second image, and outputting a restored image.

According to the method, when it is determined that there is a moiré pattern on the obtained first image of the to-be-photographed object, the terminal device moves its lens, obtains the at least one second image of the to-be-photographed object in the process of moving the lens, restores the moiré pattern region of the first image by using the at least one second image, and outputs the restored image. Therefore, a moiré effect of the image obtained by the terminal device is alleviated, thereby improving quality of the image obtained by the terminal device. In addition, the terminal device moves its lens to restore the moiré pattern region of the first image only when it is determined that there is a moiré pattern on the obtained first image of the to-be-photographed object. In other words, the terminal device can independently select an application scenario, and operations related to image restoration can be reduced.

In a possible implementation, when it is determined that there is a moiré pattern on the first image, the terminal device moves the lens by using an optical image stabilization system OIS of the terminal device. According to the method, the terminal device may control its lens to move without adding new hardware. Therefore, complexity and costs of the terminal device may be reduced.

In a possible implementation, the terminal device restores the moiré pattern region of the first image in any one of the following manners: In a first manner, if the terminal device obtains one second image in the process of moving its lens, the terminal device replaces the moiré pattern region of the first image with a corresponding region of the second image. In a second manner, if the terminal device obtains a plurality of second images in the process of moving its lens, the terminal device selects a second image whose frequencies are all less than a specified threshold from the plurality of second images, and replaces the moiré pattern region of the first image with a corresponding region of the selected second image. In a third manner, if the terminal device obtains a plurality of second images in the process of moving its lens, the terminal device performs image fusion on the first image and the plurality of second images.

According to the method, the terminal device can restore the moiré pattern region of the first image to alleviate a moiré effect of the first image, and the restoration method is simple. In addition, the terminal device restores the moiré pattern region of the first image by performing image fusion on the first image that includes a moiré pattern and the plurality of second images obtained in the process of moving the lens of the terminal device. Therefore, acutance of the first image is not reduced, thereby ensuring quality of the restored first image.

In a possible implementation, the terminal device performs image fusion on the obtained first image and the plurality of obtained second images in the following steps: The terminal device determines, for any one of the plurality of second images based on the any second image and a movement direction and a movement distance of the lens of the terminal device that is used to obtain the any second image relative to the lens used to obtain the first image, a target fusion region that is of the any second image and that is corresponding to the moiré pattern region of the first image, and performs interpolation on a pixel value of a corresponding pixel block included in the moiré pattern region of the first image by using a pixel value of each pixel block included in the target fusion region of the any second image.

According to the method, the terminal device performs interpolation processing on the moiré pattern region of the first image based on the plurality of obtained second images. Therefore, resolution of the moiré pattern region of the first image can be improved, and the moiré pattern region of the first image can be further restored.

In a possible implementation, the terminal device may obtain one or more second images of the to-be-photographed object each time its lens is moved.

In a possible implementation, the terminal device may obtain, in any one of the following two manners, the at least one second image of the to-be-photographed object in the process of moving its lens: In a first manner, the terminal device obtains one second image of the to-be-photographed object each time its lens is moved, and obtains the at least one second image of the to-be-photographed object by moving the lens for N times, where N is an integer greater than or equal to 1. In a second manner, the terminal device obtains a plurality of second images of the to-be-photographed object each time its lens is moved, and obtains a plurality of second images of the to-be-photographed object by moving the lens for N times.

In a possible implementation, the terminal device may directly output the first image if it is determined that there is no moiré pattern on the obtained first image.

Another aspect of this application provides a terminal device. The terminal device has a function of implementing behavior of the terminal device in the method example according to the first aspect. The function may be implemented by hardware, or may be implemented by hardware by executing corresponding software. The hardware or the software includes one or more modules corresponding to the function.

In a possible implementation, a structure of the terminal device includes an image obtaining unit, an image processing unit, an image display unit, and the like. The units may perform corresponding functions in the method example according to the first aspect. For details, refer to detailed descriptions in the method example according to the first aspect. Details are not described herein.

In a possible implementation, a structure of the terminal device includes components such as a photographing system, a processor, a memory, a transceiver, and a display. The memory stores a software program that supports the terminal device in performing a corresponding function in the method according to the first aspect, and the memory is coupled to the processor. The photographing system may photograph a to-be-photographed object to form an image. The processor may invoke and execute the software program stored in the memory, to remove a moiré pattern region of the image obtained by photographing the to-be-photographed object by the photographing system. The display may display an image processed by the processor.

Another aspect of this application provides a computer storage medium. The storage medium stores a software program. When being read and executed by one or more processors, the software program can implement the method provided in any implementation of any aspect.

Another aspect of this application provides a computer program product. When being read and executed by one or more processors, the computer program product can implement the method provided in any implementation of any aspect.

In the solutions provided in the embodiments of this application, when it is determined that there is a moiré pattern on the obtained first image of the to-be-photographed object, the terminal device moves its lens, obtains the at least one second image of the to-be-photographed object in the process of moving the lens, restores the moiré pattern region of the first image based on the at least one second image, and outputs the restored image. Therefore, a moiré effect of the image obtained by the terminal device is alleviated, thereby improving quality of the image obtained by the terminal device. In addition, the terminal device moves its lens to restore the moiré pattern region of the first image only when it is determined that there is a moiré pattern on the obtained first image of the to-be-photographed object. In other words, the terminal device can independently select an application scenario, and operations related to image restoration can be reduced.

DESCRIPTION OF EMBODIMENTS

Figure 1:
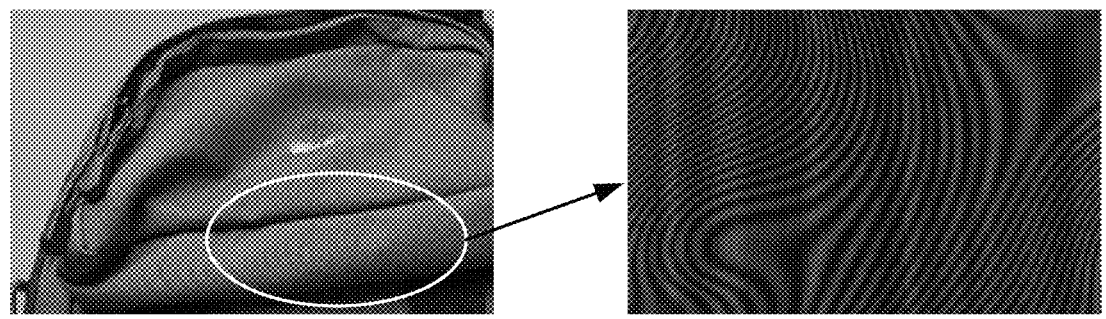
FIG. 1 is a schematic diagram of a moiré pattern on an image obtained by a terminal device.
Figure 2A:
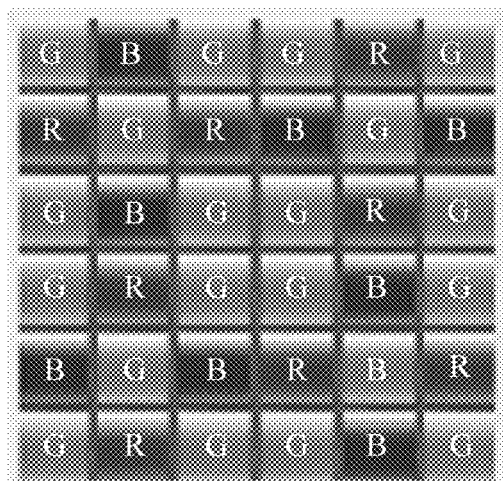
FIG. 2a is a schematic diagram of a sensor with a 6×6 photosensitive unit array in the prior art.
Figure 2B:
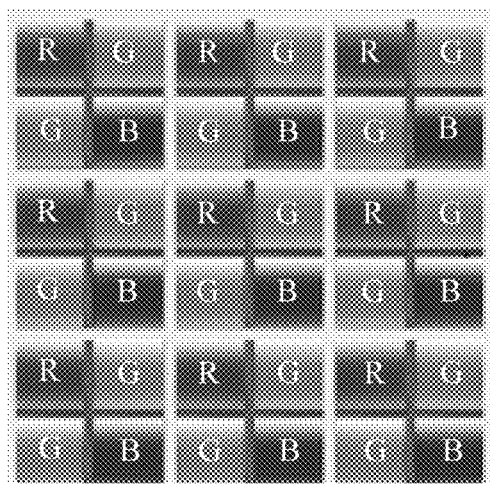
FIG. 2b is a schematic diagram of a sensor with a 2×2 photosensitive unit array in the prior art.

This application provides an image photographing method applied to a terminal, and a terminal device, to alleviate impact of a moiré pattern on quality of a photographed image. The method and the terminal device in this application are based on a same inventive concept. Because problem-resolving principles of the method and the terminal device are similar, mutual reference may be made to embodiments of the terminal device and the method. No repeated description is provided.

The image photographing method applied to a terminal provided in the embodiments of this application may be applied to a scenario in which there is a moiré pattern on an image obtained by a terminal device by using a photographing system of the terminal device. When it is determined that there is a moiré pattern on an obtained first image of a to-be-photographed object, the terminal device may move its lens, obtain at least one second image of the to-be-photographed object in a process of moving the lens, restore a moiré pattern region of the first image based on the at least one obtained second image of the to-be-photographed object, and output a restored image. That the terminal device obtains a second image of the to-be-photographed object in a process of moving its lens is equivalent to performing blurring processing on an image of the to-be-photographed object to some extent. Therefore, the second image has fewer high frequency components than the first image, that is, the second image is less affected by a moiré effect, so that the terminal device can restore the moiré pattern region of the first image based on the at least one second image, thereby alleviating a moiré effect of the image obtained by the terminal device.

Based on the method, the terminal device restores the moiré pattern region of the first image of the to-be-photographed object by using the at least one second image of the to-be-photographed object that is obtained in the process of moving the lens of the terminal device. Therefore, the moiré effect of the image obtained by the terminal device can be alleviated, thereby improving quality of the image obtained by the terminal device. In addition, the terminal device moves its lens to restore the moiré pattern region of the first image only when it is determined that there is a moiré pattern on the obtained first image of the to-be-photographed object. In other words, the terminal device can independently select an application scenario, and an unnecessary operation related to image restoration may be avoided.

Some terms in the embodiments of this application are explained and described below, to facilitate understanding of a person skilled in the art.

(1) A terminal device is a device that includes a built-in photographing system and that can implement an image (video) photographing function. The terminal device may be a mobile phone, a tablet computer, a digital camera, or the like.

(2) A moiré pattern is an irregular color stripe on an image obtained by using a photosensitive element of a device such as a mobile phone, a digital camera, or a scanner that encounters high frequency interference in a photographing or scanning process.

(3) Image fusion means that image data of a same target that is collected from a multi-source channel is processed by performing image processing, by using a computer technology, and the like to extract advantageous information from the channels as much as possible, and is finally combined into a high-quality image, so as to improve image information utilization, computer interpretation precision and reliability, and spatial resolution and spectral resolution of a raw image.

(4) "A plurality of" refers to two or more than two.

(5) "And/or" describes an association relationship between associated objects, and indicates that three relationships may exist. For example, A and/or B may represent the following three cases: Only A exists, both A and B exist, and only B exists. The character "/" generally indicates an "or" relationship between the associated objects.

In addition, it should be understood that, in descriptions of this application, words such as "first" and "second" are merely used to distinguish between descriptions, but cannot be understood as an indication or implication of relative importance, and cannot be understood as an indication or implication of a sequence.

Figure 3:
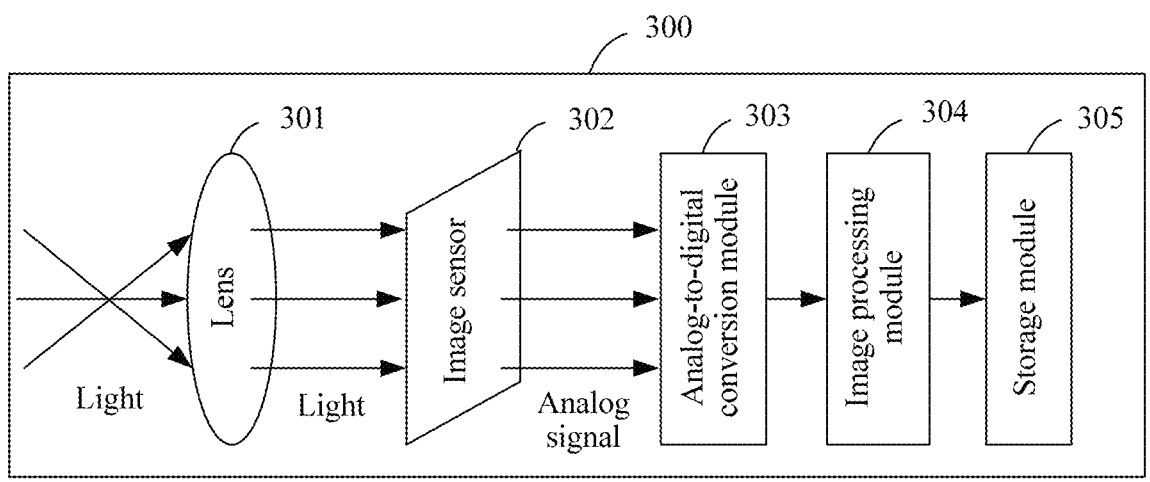
FIG. 3 is a schematic structural diagram of a photographing system of a terminal device according to an embodiment of this application.

The embodiments of this application provide an image photographing method and a terminal device. The method is applied to a terminal device. FIG. 3 shows a possible structure of a photographing system of a terminal device. The photographing system 300 mainly includes a lens 301, an image sensor 302, an analog-to-digital conversion module 303, an image processing module 304, and a storage module 305. The lens 301 is configured to: capture light reflected by a to-be-photographed object, and focus the captured light on the image sensor 302. The image sensor 302 is configured to convert the light captured by the lens 301 into an analog signal corresponding to an image of the to-be-photographed object, and may be a CCD sensor or a COMS sensor. The analog-to-digital conversion module 303 is configured to convert the analog signal that is output by the image sensor 302 into a digital signal. The image processing module 304 is configured to: perform processing such as color correction and white balance on the digital signal that is output by the analog-to-digital conversion module 303 and that is corresponding to the image of the to-be-photographed object, and encode processed data into an image format supported by the terminal device. The storage module 305 is configured to store an image file that is output by the image processing module.

Although not shown in FIG. 3, the photographing system 300 shown in FIG. 3 may further include a signal processing module, configured to perform signal processing such as amplification and filtering on the analog signal that is output by the image sensor.

Figure 4:
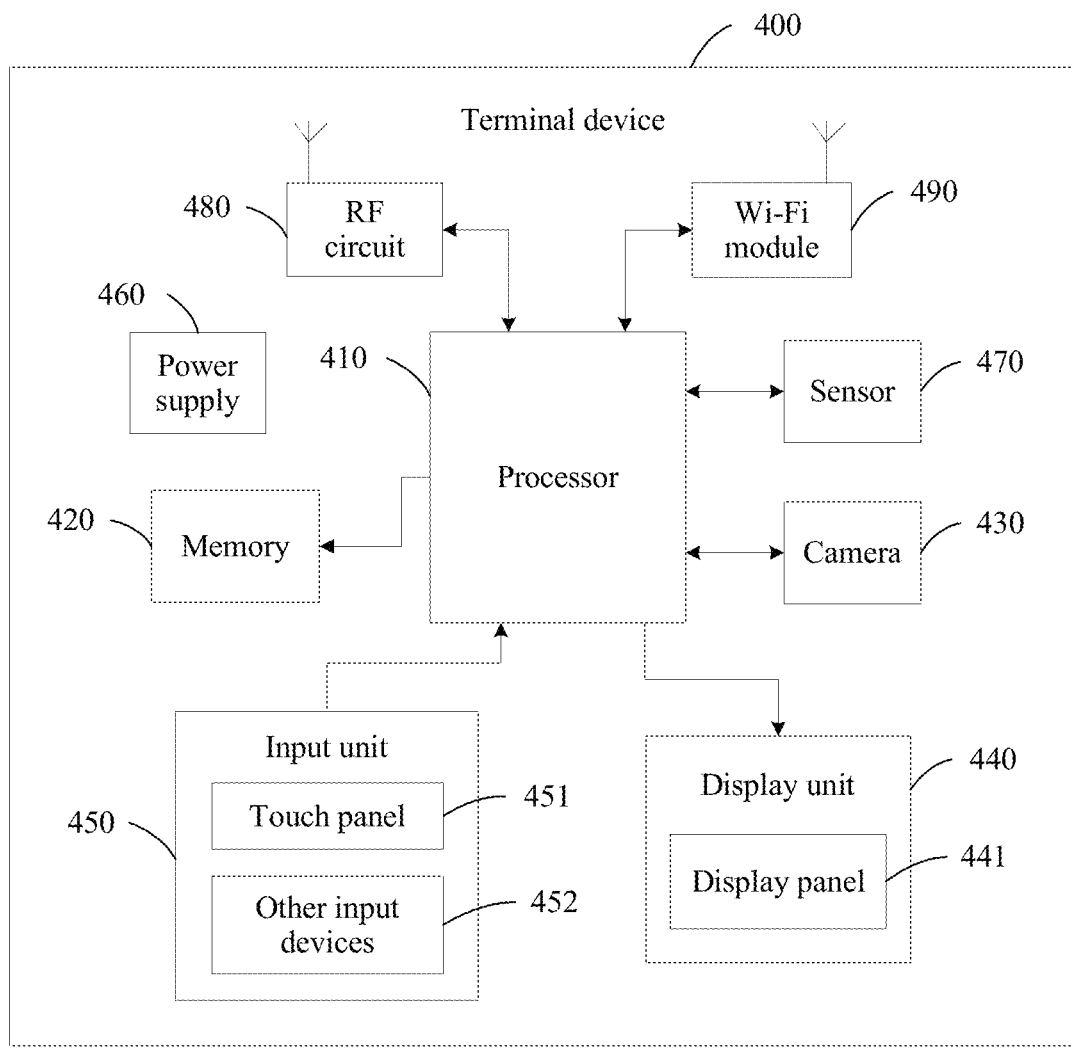
FIG. 4 is a structural diagram of a first terminal device according to an embodiment of this application.

FIG. 4 is a possible structural diagram of a terminal device. The terminal device has the photographing system 300 shown in FIG. 3. Referring to FIG. 4, the terminal device 400 includes components such as a processor 410, a memory 420, a camera 430, and a display unit 440. It may be understood by a person skilled in the art that the structure of the terminal device shown in FIG. 4 constitutes no limitation on the terminal device. The terminal device may include more or fewer components than those shown in the figure, or combine some components, or have different component arrangements.

The components of the terminal device 400 are described below in detail with reference to FIG. 4.

The memory 420 may be configured to store a software program and data. The processor 410 performs various function applications of the terminal device 400 and data processing by running the software program and the data stored in the memory 420. The memory 420 may mainly include a program storage area and a data storage area. The program storage area may store an operating system, various applications (for example, a photographing application), and the like. The data storage area may store data (for example, a photographed image and a video file) created based on use of the terminal device 400, and the like, to implement a function of a storage module 305 in the photographing system 300. In addition, the memory 420 may include a high-speed random access memory, and may further include a nonvolatile memory, for example, at least one magnetic disk storage device, a flash storage device, or another volatile solid-state storage device.

The processor 410 is a control center of the terminal device 400, connects to the components by using various interfaces and lines, and performs various functions of the terminal device 400 and data processing by running or executing the software program and/or a module stored in the memory 420 and by invoking the data stored in the memory 420, so as to implement a plurality of services based on the terminal device. The processor 410 may include one or more general-purpose processors, may further include one or more digital signal processors (digital signal processor, DSP), and may also include one or more image signal processors (image signal processor, ISP), and is configured to perform related operations, to implement a technical solution provided in some embodiments of this application. For example, the processor 410 may implement functions of an analog-to-digital conversion module 303 and an image processing module 304 in the photographing system 300 by using the DSP.

The camera 430 is configured to implement a photographing function of the terminal device 400 to obtain an image or a video. The camera 430 may be an ordinary camera, or may be a focusing camera. The camera 430 includes a lens 301 and an image sensor 302.

The display unit 440 includes a display panel 441, is configured to display information entered by a user or information provided for a user, various menu interfaces of the terminal device 400, and the like, and is mainly configured to display an image obtained by the camera of the terminal device 400 in some embodiments of this application. Optionally, the display panel 441 may be configured in a form of a liquid crystal display (liquid crystal display, LCD), an organic light-emitting diode (organic light-emitting diode, OLED), or the like.

The terminal device 400 may further include an input unit 450, configured to: receive entered digital information, character information, or a contact touch operation/non-contact gesture, generate signal input related to user settings and function control of the terminal device 400, and the like. Specifically, in some embodiments of this application, the input unit 450 may include a touch panel 451. The touch panel 451, also referred to as a touchscreen, may collect a touch operation performed by a user on or near the touch panel 451 (for example, an operation performed by the user on the touch panel 451 or near the touch panel 451 by using any proper object or accessory such as a finger or a stylus), and drive a corresponding connected apparatus based on a preset program. Optionally, the touch panel 451 may include two parts: a touch detection apparatus and a touch controller. The touch detection apparatus detects a touch orientation of the user, detects a signal brought by a touch operation, and transfers the signal to the touch controller. The touch controller receives touch information from the touch detection apparatus, converts the touch information into coordinates of a touch point, sends the coordinates to the processor 410, and can receive and execute a command sent by the processor 410. For example, the user taps an image photographing icon on the touch panel 451 with a finger. The touch detection apparatus detects a signal brought by this tap, and sends the signal to the touch controller. The touch controller converts the signal into coordinates, and sends the coordinates to the processor 410. The processor 410 determines, based on the coordinates and a type of the signal (a tap or a double tap), an operation (enabling) performed on the icon.

The touch panel 451 may be implemented by using a plurality of types such as a resistive type, a capacitive type, an infrared type, and a surface acoustic wave type. In addition to the touch panel 451, the input unit 450 may further include other input devices 452. The other input devices 452 may include but are not limited to one or more of a physical keyboard, a function key (for example, a photographing control key or an on/off key), a trackball, a mouse, a joystick, and the like.

Further, the touch panel 451 may cover the display panel 441. When detecting a touch operation on or near the touch panel 441, the touch panel 441 transfers the touch operation to the processor 410 to determine a type of a touch event. The processor 410 then provides corresponding visual output on the display panel 441 based on the type of the touch event.

In addition to the foregoing components, the terminal device 400 may further include a power supply 460 configured to supply power to other modules. The terminal device 400 may further include one or more sensors 470, for example, an infrared sensor, a laser sensor, a location sensor, or a lens pointing angle sensor. The terminal device 400 may further include a radio frequency (radio frequency, RF) circuit 480, configured to receive and send data in a communication or call process. Particularly, after receiving downlink data from a base station, the RF circuit 480 sends the downlink data to the processor 410 for processing, and sends to-be-sent uplink data to the base station. Generally, the RF circuit 480 includes but is not limited to an antenna, at least one amplifier, a transceiver, a coupler, a low noise amplifier (Low Noise Amplifier, LNA), and a duplexer. In addition, the RF circuit 480 may further communicate with a network and another device through wireless communication. The terminal device 400 may further include a Wi-Fi module 490, configured to perform Wi-Fi communication with another device to obtain an image, data, or the like transmitted by the another device.

Figure 5:
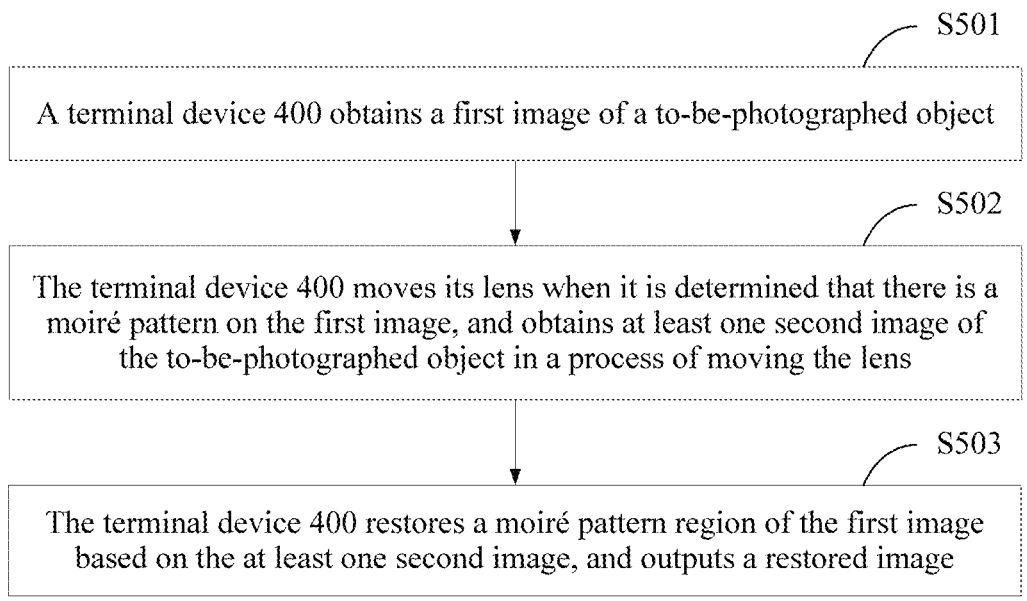
FIG. 5 is a schematic flowchart of an image photographing method applied to a terminal according to an embodiment of this application.

An embodiment of this application provides an image photographing method applied to a terminal. The method is applicable to the terminal device 400 shown in FIG. 4 that has the photographing system 300 shown in FIG. 3. In some embodiments of this application, the terminal device 400 is used as an example for description. Certainly, a solution in some embodiments may be further applied to a device of another structure such as a photographing device or a camera. Referring to FIG. 5, a specific procedure of the method includes the following steps.

S501. The terminal device 400 obtains a first image of a to-be-photographed object.

Specifically, the terminal device 400 may obtain the first image of the to-be-photographed object in the following steps: An input unit 450 of the terminal device 400 receives a gesture that is entered by a user and that is used to enable a photographing function, generates an instruction of enabling the photographing function, and sends the instruction to a processor 410 of the terminal device 400. The processor 410 enables the photographing function based on the instruction, and controls a photographing system 300 of the terminal device 400 to photograph the to-be-photographed object, to obtain the first image of the to-be-photographed object.

S502. The terminal device 400 moves its lens when it is determined that there is a moiré pattern on the first image, and obtains at least one second image of the to-be-photographed object in a process of moving the lens.

Because focusing is inaccurate when the lens of the terminal device 400 is moved back and forth, the second image obtained by the terminal device 400 has poor imaging quality, and cannot be used to restore a moiré pattern region of the first image. Therefore, the terminal device 400 controls its lens to move on a plane perpendicular to an optical axis of the lens, for example, controls its lens to move upward, downward, leftward, or rightward relative to a position at which the first image is obtained.

Specifically, the terminal device 400 may perform S502 in the following steps: The processor 410 of the terminal device 400 sends, when it is determined that there is a moiré pattern on the first image, a control instruction of moving a lens 301 in the photographing system 300 to the photographing system 300 of the terminal device 400, to control the lens 301 to move. The photographing system 300 moves the lens 301 based on the control instruction, and photographs the to-be-photographed object in the process of moving the lens 301 to obtain the at least one second image of the to-be-photographed object.

In a specific implementation, the terminal device 400 may determine, by using the following process, that there is a moiré pattern on the first image.

Fourier transform is performed on the first image to obtain frequency domain information of the first image. When a frequency in the frequency domain information of the first image is greater than a first specified value and an amplitude corresponding to the frequency is greater than frequency domain information with a second specified value, it is determined that there is a moiré pattern on the first image. The first specified value is determined based on a spatial frequency of a pixel of a photosensitive unit of an image sensor of the terminal device 400, and the second specified value is determined based on an empirical value or a simulation result.

Optionally, the terminal device 400 may move the lens by using its optical image stabilization (optical image stabilization, OIS) system. Because the terminal device 400 moves the lens by using its OIS system, no new hardware needs to be added to the terminal device 400 to control the lens to move. Therefore, complexity and costs of the terminal device 400 may be reduced.

In a specific implementation, when it is determined that there is a moiré pattern on the obtained first image, the terminal device 400 obtains one or more second images of the to-be-photographed object each time its lens is moved, so as to obtain the at least one second image of the to-be-photographed object.

Specifically, the terminal device 400 may obtain, in any one of the following two manners or another manner, the at least one second image of the to-be-photographed object in the process of moving its lens.

In a first manner, the terminal device 400 obtains one second image of the to-be-photographed object each time its lens is moved, and obtains the at least one second image of the to-be-photographed object by moving the lens for N times, where N is an integer greater than or equal to 1.

In a second manner, the terminal device 400 obtains a plurality of second images of the to-be-photographed object each time its lens is moved, and obtains a plurality of second images of the to-be-photographed object by moving the lens for N times.

Figure 6:
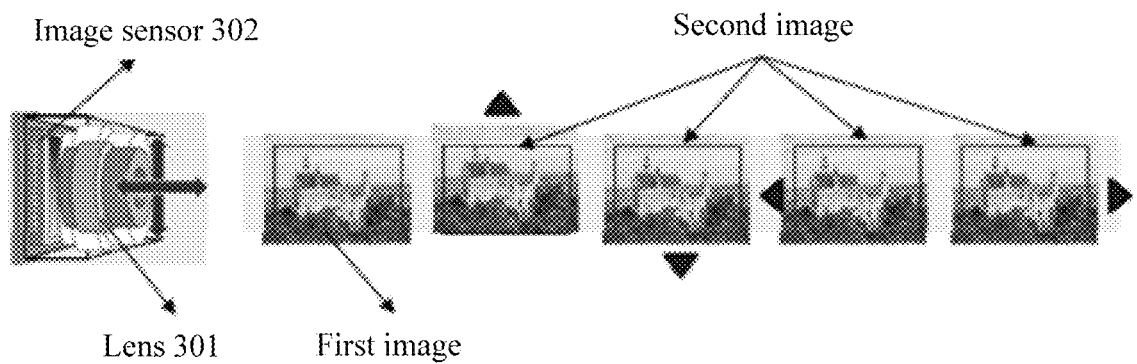
FIG. 6 is a schematic diagram of obtaining a second image according to an embodiment of this application.

It should be noted that, a movement direction and a movement distance of the lens of the terminal device 400 relative to the lens used to obtain the first image are not limited. The terminal device 400 may move the lens for N times in a direction in which the lens is used to obtain the first image, and there is a different movement distance each time. Alternatively, the terminal device 400 may move the lens for N times in a direction different from a direction in which the lens is used to obtain the first image, and there may be a same or different movement distance each time. For example, as shown in FIG. 6, when it is determined that there is a moiré pattern on the first image, the terminal device 400 controls its lens to move upward, downward, leftward, and rightward relative to a position of the lens when the first image is obtained, to obtain four second images of the to-be-photographed object.

S503. The terminal device 400 restores a moiré pattern region of the first image based on the at least one second image, and outputs a restored image.

Specifically, the terminal device 400 may perform S503 in the following steps: The processor 410 of the terminal device 400 performs, by invoking a program stored in the processor 420 of the terminal device 400, the step of restoring a moiré pattern region of the first image based on the at least one second image, and outputting a restored image.

Specifically, the terminal device 400 may output the restored image to a display unit 440 for display, and/or store the restored image in the memory 420. Alternatively, the terminal device 400 may output the restored image to another device connected to the terminal device 400 for display and/or storage. The terminal device 400 may be connected to the another device by using a Wi-Fi module 490.

Optionally, the terminal device 400 restores the moiré pattern region of the first image in any one of the following manners or another manner:

In a manner A, if the terminal device 400 obtains one second image in the process of moving its lens, the terminal device 400 replaces the moiré pattern region of the first image with a corresponding region of the second image.

In a manner B, if the terminal device 400 obtains a plurality of second images in the process of moving its lens, the terminal device 400 selects any one of the plurality of second images or a second image whose frequencies are all less than a specified threshold, and replaces the moiré pattern region of the first image with a corresponding region of the selected second image. The specified threshold is determined based on the spatial frequency of the pixel of the photosensitive unit of the image sensor of the terminal device 400. When the frequencies of the second image are all less than the specified threshold, there are relatively few moiré patterns on the second image.

In the manner A and the manner B, the terminal device 400 restores the moiré pattern region of the first image by replacing the moiré pattern region of the first image of the to-be-photographed object with the corresponding region of the second image obtained in the process of moving the lens. In this way, the method is simple, and is easy to implement.

In a manner C, if the terminal device 400 obtains a plurality of second images in the process of moving its lens, the terminal device 400 performs image fusion on the first image and the plurality of second images. The terminal device 400 may perform image fusion on the first image and the plurality of second images by using one of the following algorithms: a Brovey (Brovey) transformation image fusion algorithm, a gradient pyramid (gradient pyramid, GP) transformation image fusion algorithm, a HIS (H represents hue (hue), I represents intensity (intensity), and S represents saturation (saturation)) color space transformation image fusion algorithm, a super-resolution image fusion (super-resolution image fusion) algorithm, an interpolation algorithm, and the like.

In a specific implementation, the terminal device 400 performs image fusion on the obtained first image and the plurality of obtained second images in the following steps: The terminal device 400 obtains, for any one of the plurality of second images based on the any second image and a movement direction and a movement distance of the lens of the terminal device 400 that is used to obtain the any second image relative to the lens used to obtain the first image, a target fusion region that is of the any second image and that is corresponding to the moiré pattern region of the first image, and performs interpolation on a pixel value of a corresponding pixel block included in the moiré pattern region of the first image by using a pixel value of each pixel block included in the target fusion region of the any second image. Therefore, resolution of the moiré pattern region of the first image can be improved, and the moiré pattern region of the first image can be further restored.

The terminal device 400 may perform interpolation on the pixel value of the corresponding pixel block included in the moiré pattern region of the first image by using a bilinear interpolation algorithm, a nearest neighbor interpolation algorithm, a cubic convolution interpolation algorithm, or the like. It should be noted that, only examples are described herein, and a specific algorithm used by the terminal device 400 to perform, based on the plurality of obtained second images, interpolation on the pixel value of the corresponding pixel block included in the moiré pattern region of the first image is not limited.

Figure 7:
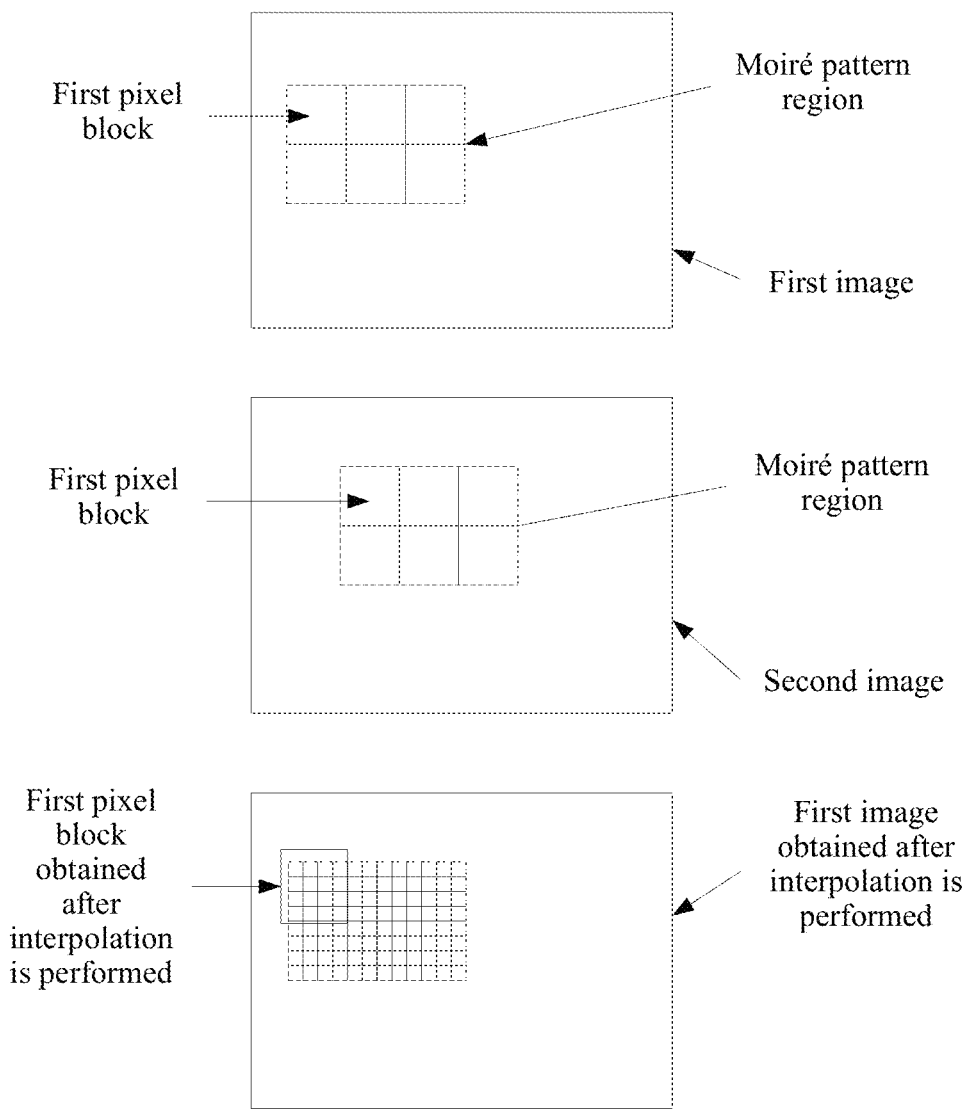
FIG. 7 is a schematic diagram of a process of performing interpolation processing on a first image according to an embodiment of this application.

For example, as shown in FIG. 7, if a pixel value of a first pixel block in the moiré pattern region of the first image of the to-be-photographed object that is obtained by the terminal device 400 is a, and a pixel value of the first pixel block corresponding to an obtained second image of the to-be-photographed object is b, the terminal device 400 performs interpolation on the first pixel block of the first image based on the pixel value a, the pixel value b, and a specified interpolation algorithm, and by analogy obtains a first image obtained after interpolation processing is performed by using the second image.

In implementation, if the terminal device 400 restores the moiré pattern region of the first image in the manner C, acutance of the restored image is not reduced, thereby ensuring quality of the restored image.

Optionally, if it is determined that there is no moiré pattern on the first image of the to-be-photographed object, the terminal device 400 may directly output the first image. In other words, after obtaining the first image, the terminal device 400 may determine an application scenario, move its lens if it is determined that there is a moiré pattern on the first image, obtain the plurality of second images of the to-be-photographed object in the process of moving the lens, and restore the moiré pattern region of the first image based on the plurality of second images. Otherwise, the terminal device 400 directly outputs the first image, and performs no operation related to image restoration.

According to the method, when it is determined that there is a moiré pattern on the first image of the to-be-photographed object, the terminal device 400 restores the moiré pattern region of the first image by using the at least one second image of the to-be-photographed object that is obtained in the process of moving its lens. Therefore, a moiré effect of the image obtained by the terminal device 400 is alleviated, thereby improving quality of the image obtained by the terminal device 400. In addition, the terminal device 400 moves its lens to restore the moiré pattern region of the first image only when it is determined that there is a moiré pattern on the obtained first image of the to-be-photographed object. In other words, the terminal device 400 can independently select an application scenario, and operations related to image restoration can be reduced.

Figure 8:
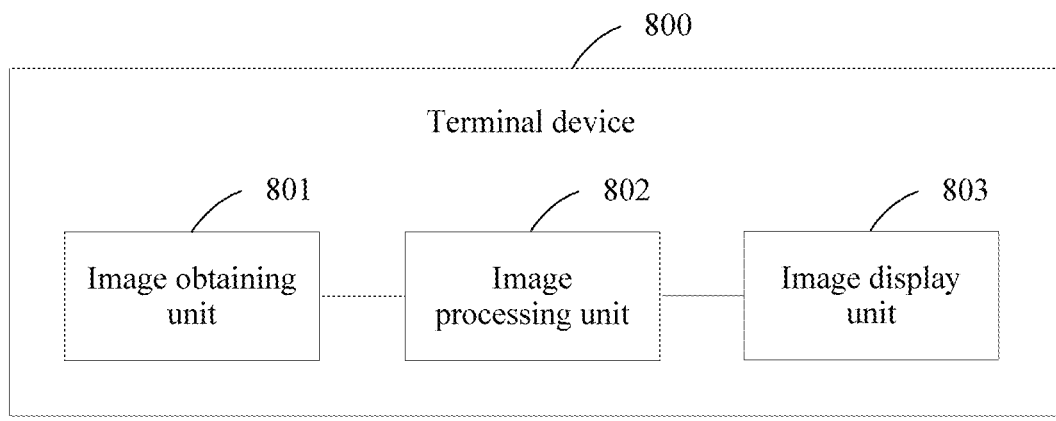
FIG. 8 is a schematic structural diagram of a second terminal device according to an embodiment of this application.

Some embodiments of this application provide a terminal device. The terminal device is configured to implement an image photographing method, in accordance with one or more embodiments. Referring to FIG. 8, the terminal device 800 includes an image obtaining unit 801 and an image processing unit 802.

The image obtaining unit 801 is configured to: obtain a first image of a to-be-photographed object that is obtained by a photographing system, and obtain, in a process of controlling, by the image processing unit 802, a lens in the photographing system to move, at least one second image of the to-be-photographed object that is obtained by the photographing system.

The image processing unit 802 is configured to: when it is determined that there is a moiré pattern on the first image, control the lens in the photographing system to move, restore a moiré pattern region of the first image based on the at least one second image obtained by the image obtaining unit 801, and output a restored image.

Optionally, the image processing unit 802 is specifically configured to control, by using an OIS system of the terminal device 800, the lens in the photographing system to move.

Optionally, the image processing unit 802 is specifically configured to:

if the image obtaining unit 801 obtains one second image in the process of moving the lens in the photographing system, replace the moiré pattern region of the first image with a corresponding region of the second image; or if the image obtaining unit 801 obtains a plurality of second images in the process of moving the lens in the photographing system, select a second image whose frequencies are all less than a specified threshold from the plurality of second images, and replace the moiré pattern region of the first image with a corresponding region of the selected second image; or if the image obtaining unit 801 obtains a plurality of second images in the process of moving the lens in the photographing system, perform image fusion on the first image and the plurality of second images.

Optionally, the image processing unit 802 is specifically configured to:

determine, based on any second image and a movement direction and a movement distance of the lens used to obtain the any second image relative to the lens used to obtain the first image, a target fusion region that is of the any second image and that is corresponding to the moiré pattern region of the first image; and perform interpolation on a pixel value of a corresponding pixel block included in the moiré pattern region of the first image by using a pixel value of each pixel block included in the target fusion region of the any second image.

Optionally, the image obtaining unit 801 is specifically configured to obtain one or more second images of the to-be-photographed object each time the lens in the photographing system is moved.

Optionally, the image processing unit 802 is further configured to output the first image if it is determined that there is no moiré pattern on the first image.

Optionally, the terminal device 800 further includes an image display unit 803, configured to display the first image and the restored first image that is output by the image processing unit 802.

An embodiment of this application provides a terminal device. When it is determined that there is a moiré pattern on an obtained first image of a to-be-photographed object, the terminal device may restore a moiré pattern region of the first image, to alleviate impact of a moiré effect on quality of the photographed image. Therefore, the quality of the photographed image can be improved.

It should be noted that, the unit division in the embodiments of this application is an example, and is merely logical function division and may be another division manner in an actual implementation. Functional modules in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) or a processor (processor) to perform all or some of the steps of the methods described in the embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

Figure 9:
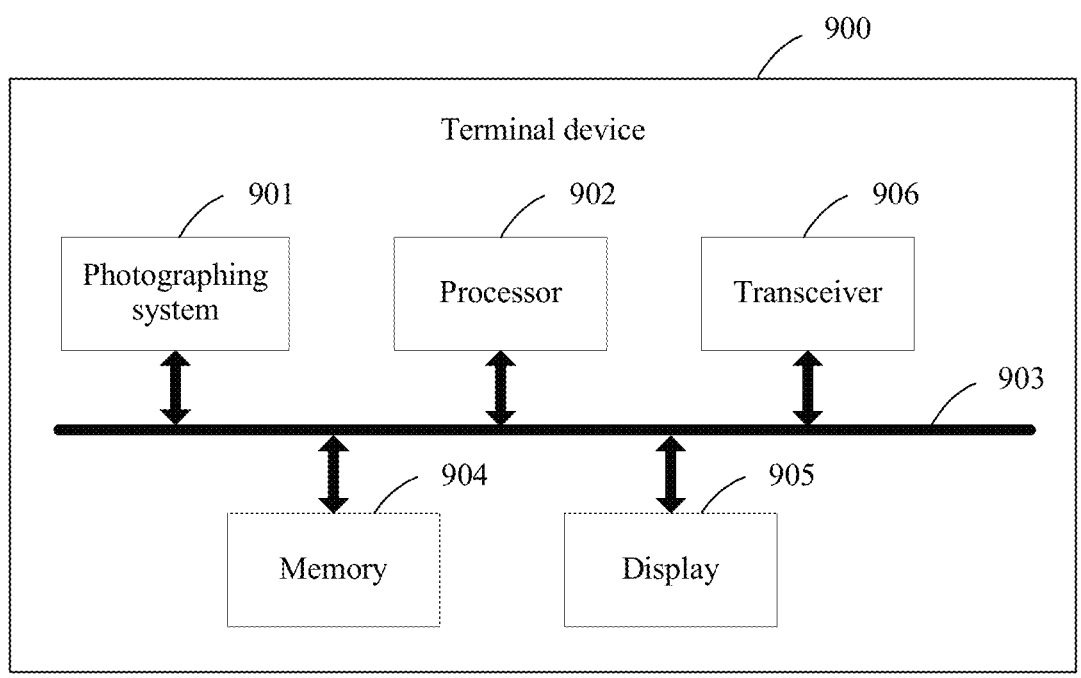
FIG. 9 is a schematic structural diagram of a third terminal device according to an embodiment of this application.

Some embodiments of this application provide a terminal device. The terminal device is configured to implement an image photographing method in accordance with one or more embodiments, and has functions of the terminal device 800 shown in FIG. 8. Referring to FIG. 9, the terminal device 900 includes a photographing system 901 and a processor 902. The photographing system 901 includes a lens.

The photographing system 901 is configured to: obtain a first image of a to-be-photographed object by using the lens, move the lens in the photographing system 901 under instruction of the processor 902, and obtain, in a process of moving the lens, at least one second image of the to-be-photographed object by using the lens. Optionally, a specific structure of the photographing system 901 is shown in FIG. 3.

The processor 902 is configured to: send, when it is determined that there is a moiré pattern on the first image obtained by the photographing system 901, an instruction to the photographing system 901 to instruct the photographing system 901 to obtain the at least one second image of the to-be-photographed object by using the moving lens, restore a moiré pattern region of the first image based on the at least one second image obtained by the photographing system 901, and output a restored image.

Optionally, the photographing system 901 and the processor 902 are connected to each other by using a bus 903. The bus 903 may be a peripheral component interconnect (peripheral component interconnect, PCI) bus, an extended industry standard architecture (extended industry standard architecture, EISA) bus, or the like. The bus may be classified into an address bus, a data bus, a control bus, and the like. For ease of representation, only one thick line is used to represent the bus in FIG. 9, but this does not mean that there is only one bus or only one type of bus.

Optionally, when moving the lens, the photographing system 901 is specifically configured to move the lens by using an OIS system of the photographing system 901.

Optionally, when restoring the moiré pattern region of the first image based on the at least one second image, the processor 902 is specifically configured to:

if the photographing system 901 obtains one second image in the process of moving the lens, replace the moiré pattern region of the first image with a corresponding region of the second image; or if the photographing system 901 obtains a plurality of second images in the process of moving the lens, select a second image whose frequencies are all less than a specified threshold from the plurality of second images, and replace the moiré pattern region of the first image with a corresponding region of the selected second image; or if the photographing system 901 obtains a plurality of second images in the process of moving the lens, perform image fusion on the first image and the plurality of second images.

Optionally, when performing image fusion on the first image and the plurality of second images, the processor 902 is specifically configured to:

determine, based on any second image and a movement direction and a movement distance of the lens used by the photographing system 901 to obtain the any second image relative to the lens used to obtain the first image, a target fusion region that is of the any second image and that is corresponding to the moiré pattern region of the first image; and perform interpolation on a pixel value of a corresponding pixel block included in the moiré pattern region of the first image by using a pixel value of each pixel block included in the target fusion region of the any second image.

Optionally, when moving the lens and obtaining, in the process of moving the lens, the at least one second image of the to-be-photographed object by using the lens, the photographing system 901 is specifically configured to obtain one or more second images of the to-be-photographed object by using the lens each time the lens of the photographing system 901 is moved.

Optionally, the processor 902 is further configured to output the first image if it is determined that there is no moiré pattern on the first image obtained by the photographing system 901.

Optionally, the terminal device 900 further includes a memory 904, which is connected to the photographing system 901 and the processor 902. The memory 904 is configured to store a program, the image obtained by the photographing system 901, the restored image that is output by the processor 902, and the like. Specifically, the program may include program code, and the program code includes an instruction. The memory 904 may include a RAM, and may further include a nonvolatile memory (nonvolatile memory) such as at least one magnetic disk memory. The processor 902 implements the foregoing functions by executing the application program stored in the memory 904, to implement the image photographing method shown in FIG. 5.

Optionally, the terminal device 900 further includes a display 905, configured to display the first image that includes no moiré pattern and that is output by the processor 902 or the image restored by the processor 902.

Optionally, the terminal device 900 may further include a transceiver 906, which is connected to the processor 902 and the memory 904, and is configured to receive and send data. For example, under control of the processor 902, the transceiver 906 sends the restored image to another device.

An embodiment of this application provides a terminal device. When it is determined that there is a moiré pattern on an obtained first image of a to-be-photographed object, the terminal device may restore a moiré pattern region of the first image, to alleviate impact of a moiré effect on quality of the image obtained by the terminal device. Therefore, the quality of the image obtained by the terminal device can be improved.

In conclusion, the embodiments of this application provide the image photographing method and the terminal device. In the method, the terminal device obtains the first image of the to-be-photographed object, controls its lens to move when it is determined that there is a moiré pattern on the first image, obtains the at least one second image of the to-be-photographed object in the process of moving the lens, restores the moiré pattern region of the first image based on the at least one second image, and outputs the restored image. Therefore, impact of a moiré effect on quality of the image obtained by the terminal device is alleviated, thereby improving the quality of the photographed image.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the embodiments of this application without departing from the spirit and scope of the embodiments of this application. This application is intended to cover these modifications and variations provided that they fall within the scope of protection defined by the following claims and their equivalent technologies.

What is claimed is:

1. A method, comprising:
    obtaining a first image of a to-be-photographed object based on an input received by way of a user interface, the first image being obtained using a terminal having a lens in a first position;
    detecting, by a processor, a moiré pattern on the first image;
    in response to detecting the moiré pattern on the first image, automatically moving the lens from the first position to a second position on a plane perpendicular to an optical axis of the lens;
    obtaining at least one second image of the to-be-photographed object, wherein obtaining the at least one second image comprises obtaining one or more of the at least one second image with the lens in the second position or with the lens between the first position and the second position;
    restoring a detected moiré pattern region of the first image based on the at least one second image to generate a restored image by replacing the moiré pattern region of the first image with a corresponding region of the at least one second image to generate the restored image, and
    outputting the restored image to a display.

2. The method according to claim 1, wherein moving the lens comprises:
    moving the lens by using an optical image stabilization OIS system of the terminal.

3. The method according to claim 1, wherein restoring the detected moiré pattern region further comprises:
    determining the at least one second image comprises a plurality of second images, and
    selecting a second image of the plurality of second images having frequencies that are all less than a specified threshold as a restoration image, and the corresponding region of the at least one second image is a corresponding region of the restoration image.

4. The method according to claim 1, wherein one or more second images of the to-be-photographed object are obtained each time the lens is moved.

5. The method according to claim 1, further comprising:
    outputting the first image to the display based on a determination that the first image is free from having the moiré pattern.

6. A terminal device, comprising:
    a photographing system comprising a lens;
    one or more processors; and
    a memory, having computer readable instructions stored thereon that, when executed by the one or more processors, cause the terminal device to:
        obtain a first image of a to-be-photographed object based on an input received by way of a user interface, the first image being obtained with the lens in a first position;
        detect a moiré pattern on the first image;
        in response to detecting the moiré pattern on the first image, automatically move the lens from the first position to a second position on a plane perpendicular to an optical axis of the lens;
        obtain at least one second image of the to-be-photographed object by obtaining one or more of the at least one second image with the lens in the second position or with the lens between the first position and the second position;
        restore a detected moiré pattern region of the first image based on the at least one second image to generate a restored image by replacing the moiré pattern region of the first image with a corresponding region of the at least one second image to generate the restored image, and
        output the restored image to a display.

7. The terminal device according to claim 6, wherein the photographing system comprises an optical image stabilization OIS system configured to move the lens.

8. The terminal device according to claim 6, wherein the terminal device is further caused to:
    determine the at least one second image comprises a plurality of second images, and
    select a second image of the plurality of second images having frequencies that are all less than a specified threshold as a restoration image, and the corresponding region of the at least one second image is a corresponding region of the restoration image.

9. The terminal device according to claim 6, wherein the terminal device is further caused to:
obtain one or more second images of the to-be-photographed object each time the lens is moved.

10. The terminal device according to claim 6, wherein the terminal device is further caused to:
output the first image to the display based on a determination that the first image is free from having the moiré pattern.

11. The terminal device according to claim 6, further comprising:
a terminal display communicatively coupled with at least one of the one or more processors, wherein the terminal device is further caused to:
display the restored image.

12. A non-transitory computer readable medium having instructions stored thereon that, when executed by a processor, cause an apparatus to:
obtain a first image of a to-be-photographed object based on an input received by way of a user interface, the first image being obtained with a lens in a first position;
detect a moiré pattern on the first image;
in response to detecting the moiré pattern on the first image, automatically move the lens from the first position to a second position on a plane perpendicular to an optical axis of the lens;
obtain at least one second image of the to-be-photographed object by obtaining one or more of the at least one second image with the lens in the second position or with the lens between the first position and the second position;
restore a detected moiré pattern region of the first image based on the at least one second image to generate a restored image by replacing the moiré pattern region of the first image with a corresponding region of the at least one second image to generate the restored image, and
output the restored image to a display.

13. The non-transitory computer readable medium according to claim 12, wherein the apparatus is caused to move the lens using an optical image stabilization OIS system.

14. The terminal device according to claim 12, wherein the apparatus is further caused to:
determine the at least one second image comprises a plurality of second images, and
select a second image of the plurality of second images having frequencies that are all less than a specified threshold as a restoration image, and the corresponding region of the at least one second image is a corresponding region of the restoration image.

15. The terminal device according to claim 12, wherein the apparatus is further caused to:
obtain one or more second images of the to-be-photographed object each time the lens is moved.

16. The terminal device according to claim 12, wherein the apparatus is further caused to:
output the first image to the display based on a determination that the first image is free from having the moiré pattern.

17. The terminal device according to claim non-transitory computer readable medium according to claim 12, further comprising:
a terminal display communicatively coupled with at least one of the one or more processors, wherein the terminal device is further caused to:
display the restored image.

\* \* \* \* \*